Feb. 20, 1945.  S. R. GOOKIN  2,369,670
RIVET
Filed Sept. 18, 1943

INVENTOR
Sylvester R. Gookin
by Thomas Ryan
his Attorney

Patented Feb. 20, 1945

2,369,670

UNITED STATES PATENT OFFICE 2,369,670

RIVET

Sylvester R. Gookin, Marshfield, Mass., assignor to United Shoe Machinery Corporation, Flemington, N. J., a corporation of New Jersey Application September 18, 1943, Serial No. 502,954

4 Claims. (Cl. 85—40)

The purpose of the present invention is to provide an improved type of tubular rivet capable of being upset or clenched under circumstances that preclude access to its entering end except by inserting a mandrel or upsetting tool through it from the head end to and beyond the entering end. Such a rivet may be secured by pulling the mandrel toward the head end to apply the upsetting force while the head end is buttressed to prevent movement thereof.

A novel feature of a rivet embodying the invention is provided by a plurality of internal ribs extending lengthwise in the entering end thereof, these ribs being spaced one from another at their roots to provide grooves of about the same width as the ribs themselves. For the best results such a rivet should have a cylindrical bore extending from its head end to the inner ends of the ribs, and the bottoms of the grooves between the ribs should lie on the same cylinder as the bore, leaving only the ribs to interrupt the continuity of the cylindrical space inside the rivet.

A rivet having the characteristics above described may be upset or clenched in either of two ways, the choice being contingent upon the length of the cylindrical bore of the rivet and the thickness of the work to be riveted. For example, if the length of the bore is enough greater than the thickness of the work an intermediate portion of the shank may be bulged and collapsed endwise by moving the entering end of the shank toward the head end. This process will produce an annular two-ply flange having a circular fold forming its rim, and the flange will be pressed tightly against the back or inner face of the work. For this result the mandrel will be provided with segments designed to apply the upsetting force against the outer ends of the ribs lengthwise of the rivet without any component of radial force.

On the other hand, if the length of the bore is about equal to the thickness of the work the ribbed portion of the rivet may be dilated by displacing the ribs radially. For this result the mandrel will be provided with segments having inclined operating surfaces preferably in the surface of a cone. These operating surfaces will apply the dilating force progressively to the crowns of the ribs as the segments are pulled into the entering end of the rivet after being thrust through and beyond the ribs.

The mandrel, regardless of which principle of upsetting is to be performed, comprises a neck and a head. The latter is provided with grooves constituting counterparts of the ribs of the rivet. Consequently, the head is divided into a plurality of segments corresponding in number and spacing to the number and spacing of the ribs. When the mandrel is being thrust into a rivet the segments may travel between the ribs of the rivet and emerge from the ribbed end of the latter. Then the operator may rotate the mandrel or the rivet about their axis just enough to place the segments in alignment with the ribs.

If the rivet is to be collapsed endwise the ribbed portion thereof will not be dilated. Consequently, to remove the mandrel after the rivet has been collapsed, it will be necessary to turn the mandrel again to a position that will enable the segments to travel through the spaces between the ribs of the rivet. On the other hand, if the ribbed end of the rivet is to be dilated, the radial displacement of the ribs from the paths of the operating segments will enable the mandrel to be withdrawn from the rivet without any rotational movement.

Referring to the drawing,

Fig. 1 is a sectional view of a rivet embodying the invention in a form intended to be secured by dilating the ribbed portion, the plane of the section intersecting two of the ribs;

Fig. 2 includes a portion of a riveting implement in section including a mandrel designed to dilate a rivet of the form shown in Fig. 1;

Figure 1:
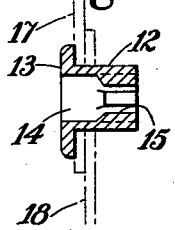

Describing first the elements in Figs. 1 to 7, the rivet comprises a cylindrical shank 12, a head 13, a throat 14 open at both ends, and four straight parallel ribs 15 of uniform section in the throat and equally spaced by grooves 16. The number of ribs may be more or less than four, but that number is preferred for rivets of the sizes most common. The throat 14 is a cylinder from the head end to the inner ends of the ribs and between the ribs. The peripheral surface of the shank 12 is initially circular (Fig. 4) and of uniform diameter.

Figure 5:
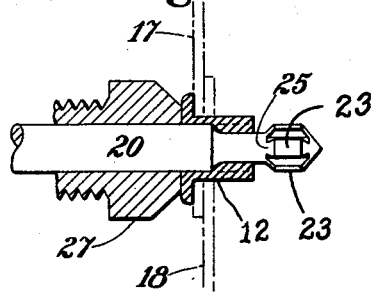
Fig. 5 represents the rivet of Fig. 1 and the mandrel of Fig. 2 assembled by thrusting the mandrel through the rivet.
Figure 6:
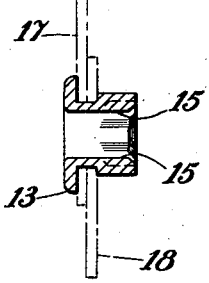
Fig. 6 represents the rivet of Fig. 1 as having been dilated and secured in two lapped plates.
Figure 7:
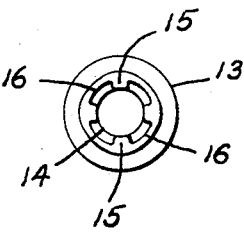
Fig. 7 is an end elevation of the rivet in Fig. 6.

In Figs. 1, 5 and 6 two plates 17 and 18 (dotted lines) represent the work to be riveted. The rivets are first bored with a small drill, then counterbored to the desired depth from their head ends before the entering ends are broached to form the ribs 15 and the grooves 16. The distance from the plane of the inner face of the head 13 to the inner ends of the ribs should be no less than the aggregate thickness of the work 17, 18, but it may be greater.

The mandrel for dilating the ribbed portion comprises a cylindrical shank or body 20, a head 21 and a cylindrical neck 22 connecting them. The head is also cylindrical except that it is divided into segments 23 by four grooves 24, these grooves being counterparts of the ribs 15 while the segments are counterparts of the grooves 16, but the grooves are slightly wider than the ribs and segments to provide clearance. The diameter of the neck 22 is the same, less a slight margin for clearance, as the inside diameter of the ribs 15, and the length of the neck is sufficient to project the head 21 through and beyond the ribbed end of the rivet, as shown in Fig. 5. Preferably, the crown of the head 21 is conical or otherwise tapered to facilitate its entry into and passage through the rivet. Moreover, the inner ends of the segments 23 are provided with inclined surfaces 25 the purpose of which is to dilate the ribs 15 when the mandrel is pulled. These surfaces 25 may all lie on the surface of a cone.

The mandrel may be attached to a hand-operated implement of a type now in commercial use. Such an implement comprises a barrel 26, an anvil 27 screwed into the barrel, a check nut 28 for maintaining the anvil in various positions of axial adjustment, a plunger (not shown) to which the shank of the mandrel may be affixed, and a lever (not shown) for moving the plunger and the mandrel endwise. The mandrel slides in a bore in the anvil.

A rivet may be placed on the mandrel as shown in Fig. 5 before being inserted into the work, or it may first be inserted into the work as shown in Fig. 1. In either case the rivet or the mandrel will be turned about its axis after the head of the mandrel has cleared the ribs 15, the extent of turning being that required to place the segments 23 in alignment with the ribs 15 (Fig. 5). Now, if the operator pulls the head of the mandrel toward the anvil 27 by moving the lever of the implement the inclined surfaces 25 of the segments will displace the ribs 15 radially, the metal connecting the ribs will be stretched and the ribbed end of the rivet will take the shape shown in Figs. 6 and 7. While the surfaces 25 are deflecting the ribs radially they also exert a considerable endwise force that tends to shift the ribs toward the head of the rivet, with the result that the deformed rivet metal adjacent to the work is packed tightly against the latter, the head of the rivet being meanwhile buttressed by the reactionary force of the mandrel. The operating stroke of the mandrel is long enough to carry the surfaces 25 beyond the ribs 15, leaving no metal to obstruct the removal of the head of the mandrel from the rivet.

Figure 8:
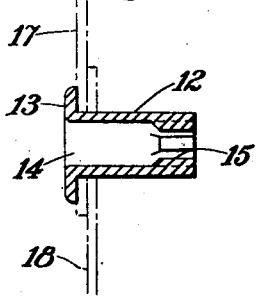
Fig. 8 is a sectional view of a longer rivet embodying the invention and adapted to be secured by collapsing an intermediate portion of its shank.
Figure 9:
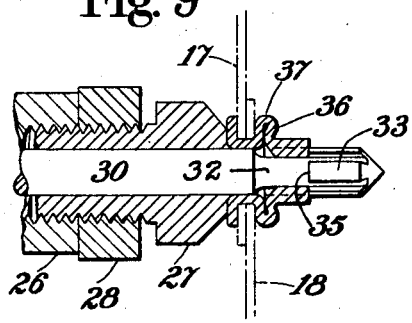
Fig. 9 represents the rivet of Fig. 8 as having been collapsed endwise and secured by the included mandrel and anvil.

A rivet having the proportions shown in Fig. 8 may be collapsed endwise as shown in Fig. 9 instead of being dilated at its ribbed end, but for this purpose a mandrel of a slightly different form is needed. Such a mandrel may have a shank 30, a neck 32 and a head divided into segments 33 by grooves 34 similar to the corresponding features illustrated in Figs. 2 and 3, but the segments 33 are provided with abrupt ends 35 instead of inclined surfaces.

Figure 10:
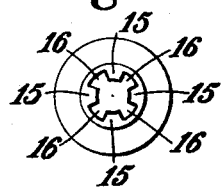
Fig. 10 is an end elevation of the rivet of Fig. 8.
Figure 11:
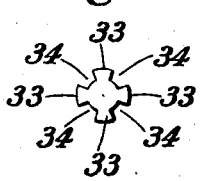
Fig. 11 is an end elevation of the head end of the mandrel included in Fig. 9.

The only difference between the rivet shown in Fig. 1 and that shown in Fig. 8 is that the latter is longer in the portion connecting the head 13 and the ribs 15. The length of this portion exceeds the thickness of the work 17, 18 by a quantity sufficient to be collapsed to form a two-ply flange 36 and a circular fold 37 connecting its layers as shown in Fig. 9. The technique for operating the upsetting implement is the same as that above described except that removal of the head of the mandrel from a clenched rivet requires turning the mandrel to place the segments 33 in alignment with the grooves 16 of the rivet. Figs. 10 and 11 illustrate the relative positions of the rivet and the mandrel for the collapsing stage in which the segments 33 will abut the outer ends of the ribs 15.

Figure 2:
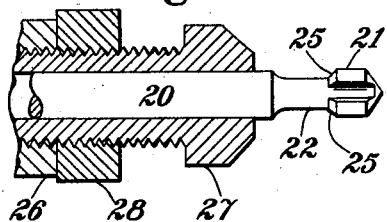
Figure 3:
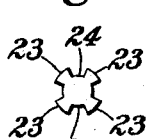
Fig. 3 is an end elevation of the head end of the mandrel in Fig. 2.
Figure 4:
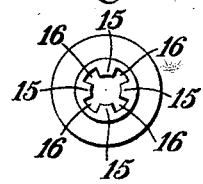
Fig. 4 is an end elevation of the rivet in Fig. 1.

The rivet shown in Fig. 8 could be upset and clenched by a mandrel of the type shown in Figs. 2 and 5, and that would be the type of mandrel to use if the thickness of the work were about equal to the length of the portion of the rivet between the flange 13 and the ribs 15. In that event the ribbed portion of the rivet would, of course, be expanded to produce the result shown in Figs. 6 and 7.

When the ribbed portion is being dilated the ribs themselves undergo little, if any, flow of metal, since the flow is localized in the thinner portions that lie between and connect the roots of the ribs. Consequently, a moderate dilating force will produce the desired outside diameter of the clenched portion. Nevertheless, once a rivet is installed by this dilating process, the rib portions reinforce the intermediate connecting portions and vice versa to maintain tightness of the rivet.

Having thus described my invention, what I claim as new and desire to secure by Letters Patent of the United States is:

1. A tubular rivet having a head, a cylindrical shank of which the peripheral surface is circular and of uniform diameter, a cylindrical throat extending through the head and the shank from end to end, and a plurality of internal longitudinal ribs in the entering end of the shank and partially obstructing the throat, said ribs extending toward the head but their inner ends being spaced from the plane of the confronting face of the head by a distance no less than the thickness of the work to be riveted, portions of the shank lying between and connecting the roots of said ribs.

2. A tubular rivet having a head, a cylindrical shank of which the peripheral surface is circular and of uniform diameter, a cylindrical throat extending through the head and the shank from end to end, and a plurality of straight parallel ribs of uniform section in and partially obstructing the throat, the outer ends of said ribs being flush with the entering end of the shank but their inner ends being spaced from the plane of the confronting face of the head by a distance no less than the thickness of the work to be riveted, and segmental portions of the shank lying between and connecting the roots of the ribs.

3. A tubular rivet having a head, a cylindrical shank of which the peripheral surface is circular and of uniform diameter, a cylindrical throat extending through the head and the shank from end to end, and a plurality of ribs of uniform section located in the entering end of the shank and extending parallel with the axis of the rivet, the ribs being equally spaced one from another and forming grooves of about the same width as that of the ribs, the bottoms of the grooves being segmental portions of the shank by which the roots of the ribs are connected.

4. An installed tubular rivet secured to a work element, the rivet having a head at one side of the element, a cylindrical shank portion extending through the element, a clenched shank portion abutting and projecting from the opposite side of the element, and a throat extending through the rivet from end to end, the clenched portion being tubular and having a plurality of internal ribs and grooves extending lengthwise of the rivet.

SYLVESTER R. GOOKIN.